J. H. GLOVER.
Wheels for Vehicles.

No. 146,818.  Patented Jan. 27, 1874.

Witnesses:
E. Wolff
Alex F. Roberts

Inventor:
Jos. H. Glover
Per
Munn & Co
Attorneys.

UNITED STATES PATENT OFFICE.

JOSEPH H. GLOVER, OF FREEDOM, KENTUCKY.

IMPROVEMENT IN WHEELS FOR VEHICLES.

Specification forming part of Letters Patent No. 146,818, dated January 27, 1874; application filed September 27, 1873.

*To all whom it may concern:*

Figure 1:
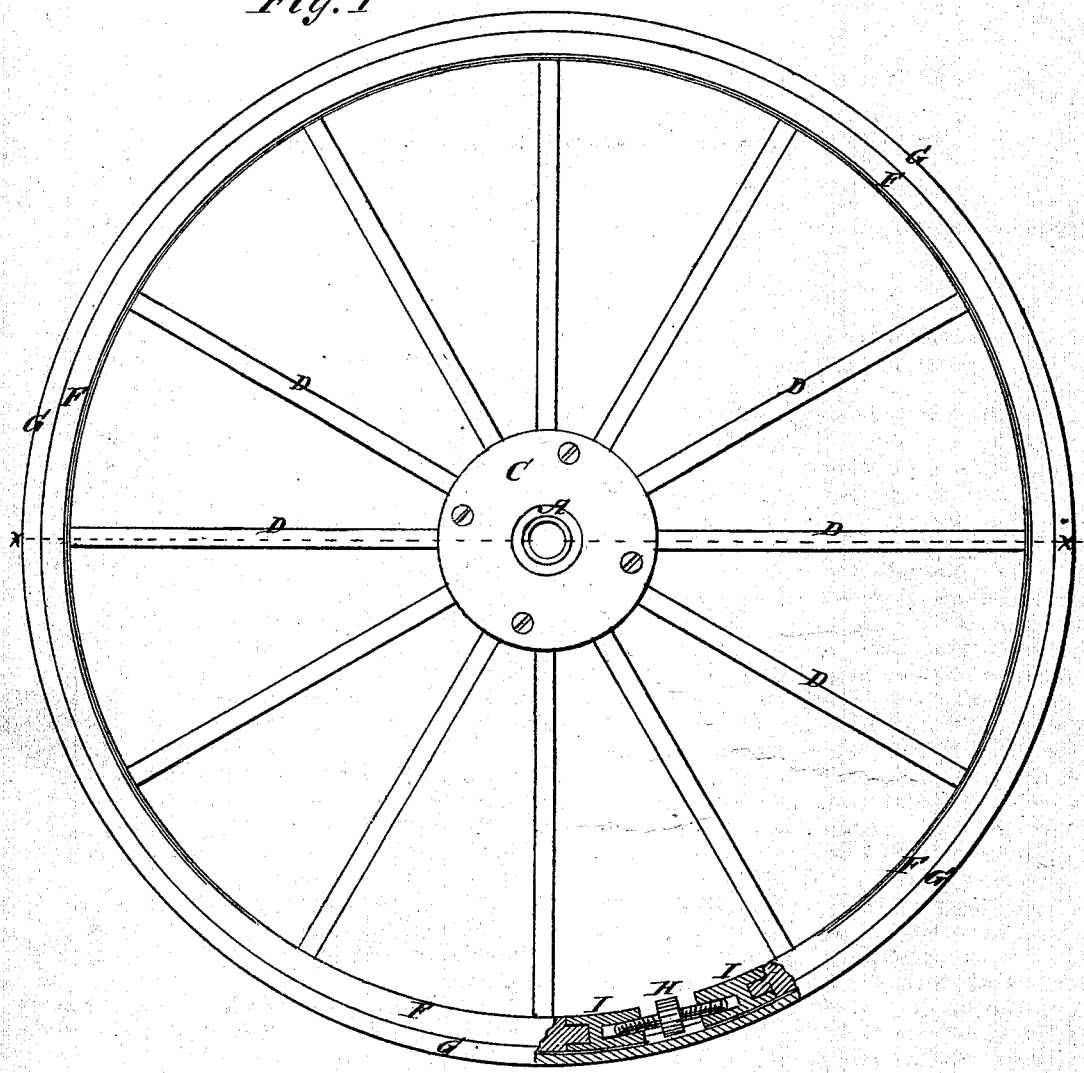
Figure 2:
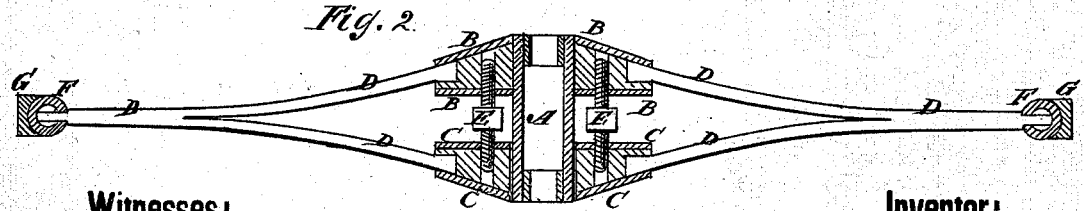

Be it known that I, JOSEPH H. GLOVER, of Freedom, in the county of Barren and State of Kentucky, have invented a new and useful Improvement in Vehicle-Wheel, of which the following is a specification:

Figure 1 is a side view of my improved wheel, partly in section, to show the construction. Fig. 2 is a detail cross-section of the wheel, taken through the line $x$ $x$, Fig. 1.

Similar letters of reference indicate corresponding parts.

The invention relates to construction and arrangement of devices for adapting a wheel for application of a cold tire and securing the same to the felly, as hereinafter described.

A is the tube that receives the axle, and which has boxes to receive the wear inserted in its ends. The hub is made in two parts, B C. The part B is permanently attached to the tube A, and the part C slides upon said tube A. The parts B C are made exactly alike, each part consisting of a wooden or iron core or center block, having metallic plates secured to its outer and inner sides, and having dovetailed recesses formed in its outer part to receive the dovetailed inner ends of the spokes D. The outer surface of the parts B C are made convex, or are inclined in line with the curvature of the spokes D, so that the wheel will pass any obstruction that will allow the rim of the wheel to pass, thus preventing the hubs from striking dead against said obstruction. The parts B C are connected by three or more right-and-left screws, E, which screw through the inner plates of said parts, and enter holes in their center blocks, as shown in Fig. 2. Upon the centers of the screws E are formed heads for convenience in turning them to move the parts B C toward or from each other, and thus lengthen or shorten the spokes D. The spokes D are made forked in their inner parts, and solid in their outer parts, as shown in Fig. 2. F are the fellies, which are made round, and which I prefer to make of an iron tube, in which case the tenons of the spokes D should pass through the inner wall of the fellies, and rest against their outer wall. G is the tire, the outer side of which is made flat, in the ordinary manner, and its inner side is made concave to fit upon the round fellies, and thus keep its place without screws, bolts, or rivets. In the adjacent ends of the tubular fellies F are cut screw-threads to receive the right and left screw-threads cut upon the ends of the screw H, which has a head formed upon its center for convenience in turning it to expand or contract the rim of the wheel, the spokes D being at the same time expanded or contracted correspondingly.

In case a round wooden felly is used, it should have metallic blocks or nuts I attached to its adjacent ends to receive the ends of the screw H.

Having thus described my invention, I claim as new and desire to secure by Letters Patent—

The combination of the tube A, fixed part B, sliding part C, right-and-left screws E, and forked spokes D, substantially as shown and described.

JOSEPH H. GLOVER.

Witnesses:
 E. MORRIS,
 TH. BLUMENFELD.